March 31, 1931. W. O. LITTLEBURY 1,798,332
MANUFACTURE OF FUSE HEADS FOR ELECTRICAL FIRING
Filed June 28, 1928

W. O. Littlebury
INVENTOR

By: Marks & Clerk
Attys.

Patented Mar. 31, 1931                                              1,798,332

UNITED STATES PATENT OFFICE

WILLIAM OSWALD LITTLEBURY, OF ARDROSSAN, SCOTLAND, ASSIGNOR TO E. I. DU PONT DE NEMOURS AND COMPANY, OF WILMINGTON, DELAWARE

MANUFACTURE OF FUSE HEADS FOR ELECTRICAL FIRING

Application filed June 28, 1928, Serial No. 288,923, and in Great Britain June 29, 1927.

This invention principally relates to electrically fired detonators and fuses and more specifically to the construction of the fuse head.

The principal object of the invention is to provide an improved or modified fusehead.

To that end I have made experiments and have found that advantages are obtained by the use of basic lead dinitro-salicylates and mixed basic lead salts containing the basic lead dinitro-salicylates as priming compositions for fuse heads for electrical firing.

The invention consists in a fusehead for electrical shot firing comprising an igniting device and a priming charge which includes one of the basic dinitro-salicylates of lead, either as such or mixed with other basic lead salts.

The invention also consists in a method applying basic lead dinitro-salicylates in the manufacture of fuseheads for electrical shot firing, according to which method the basic lead dinitro-salicylates are made into a paste with shellac in a suitable form, this shellac wholly or in part replacing the nitrocellulose in the collodion usually employed in fusehead manufacture.

One way of carrying the invention into effect is illustrated in the accompanying drawings, wherein:—

Figure 1:
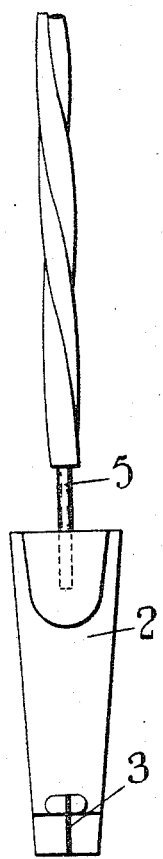
Figure 1 is an elevation of a fusehead constructed according to the invention, before coating with igniting material.
Figure 2:
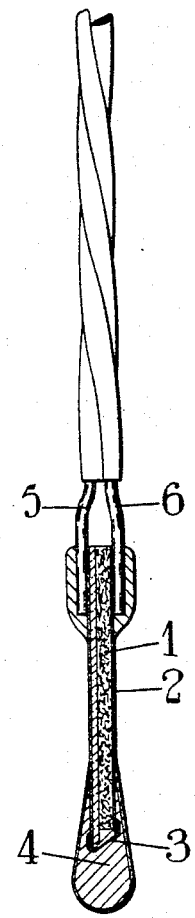
Figure 2 is a sectional elevation of the fusehead shown in Figure 1, after coating with the igniting material.

Referring to the drawings, the fusehead consists essentially of a piece of insulating material 1 such as cardboard coated on both sides with a thin layer of metallic foil 2. For low tension fuseheads a very thin wire 3 is then attached to one end of the pieces of metal foil 2, thus forming a bridge. This arrangement is next coated with readily inflammable material 4.

Leading wires 5, 6 are then attached to the free ends of the metallic foil. Such an arrangement may be fixed in a paper tube, inserted into an ordinary detonator and secured therein by crimping or by cementing. On allowing an electric current to flow by way of the leading wires and foil through the bridge wire, the material surrounding it is ignited and the flash of this in turn ignites the detonator.

The thin wire bridge is coated with a paste of finely divided basic lead dinitro-salicylate and shellac.

As a guide to the method of coating and to the composition of the coating mixture, I have found that when the basic lead dinitro-salicylates are made into a paste with the usual collodion employed in fusehead manufacture gelation takes place rapidly and the paste may soon become unworkable.

By replacing the nitrocellulose of the collodion wholly or partly by shellac, this difficulty can be overcome.

The basic lead dinitro-salicylate referred to above may be for example any of the following three salts of 3:5-dinitro-salicylic acid, namely:—

(1) $C_6H_2(NO_2)_2\diagdown^O_{COO}\diagup Pb.Pb.(OH)_2$. percentage of lead=61.4

(2) $C_6H_2(NO_2)_2\diagdown^O_{COO}\diagup Pb.2Pb.(OH)_2$. percentage of lead=67.8

(3) $C_6H_2(NO_2)_2\diagdown^O_{COO}\diagup Pb.3Pb.(OH)_2$. percentage of lead=71.6

The above salts may be made by mixing alkaline solutions of sodium dinitro-salicylate and a soluble lead salt.

The amount of free alkali to be added to the sodium dinitro-salicylate depends upon which basic lead salt it is desired to obtain.

The formation of the basic salts above may be represented by the following general equation:—

$C_6H_2(NO_2)_2(OH)COOH + xPb(NO_3)_2 + 2xNaOH =$

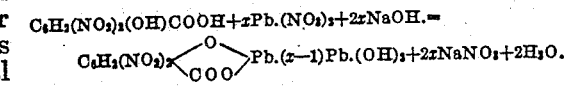
$C_6H_2(NO_2)_2\diagdown^O_{COO}\diagup Pb.(x-1)Pb.(OH)_2 + 2xNaNO_3 + 2H_2O.$ In order to prepare the salts (1), (2) and (3), the value of $x$ is to be taken as 2, 3 and 4 respectively.

According to a modification, in place of employing basic lead dinitro-salicylates as such for priming charges of fuseheads for electrical shot firing, they may be employed in the form of mixed basic lead salts containing the basic lead dinitro-salicylates.

A suitable mixture for this purpose may be prepared by adding to an alkaline solution of sodium dinitro-salicylate an alkaline solution of the sodium salts of other nitrated phenols, such as trinitro-resorcinol or trinitro-phenol with subsequent mixing of the solution thus prepared with a solution of a soluble lead salt.

Fuseheads having priming charges containing basic lead dinitro-salicylates are an improvement on fuseheads containing copper acetylide, especially from the aspect of the capacity of withstanding adverse storage conditions satisfactorily.

Fuseheads with priming charges of basic lead dinitro-salicylates represent an advance over fuseheads containing priming charges of lead trinitro-resorcinates, because basic lead dinitro-salicylates are not as powerful explosives as basic lead trinitro-resorcinates and in addition they may be ignited satisfactorily with a lower current.

Having now described my invention, what I claim as new and desire to secure by Letters Patent is:—

1. A priming charge for an electrically fired fuse which includes one of the basic lead dinitro-salicylates.

2. A priming composition for electrically fired fuses containing one of the basic lead dinitro-salicylates made up with shellac in suitable form.

3. A priming composition for electrically fired fuses containing one of the basic lead dinitro-salicylates made up with mixtures of shellac and nitrocellulose in suitable form.

4. A priming charge for an electrically-fired fuse which includes a mixture of basic lead salts containing one of the basic lead dinitro-salicylates.

5. A priming composition for electrically-fired fuses containing a mixture of basic lead salts made up with shellac in suitable form, including a basic lead dinitrosalicylate.

6. A priming composition for electrically-fired fuses containing a mixture of basic lead salts made up with mixtures of shellac and nitrocellulose in suitable form, one of which basic lead salts is a basic lead dinitrosalicylate.

In testimony whereof I have signed my name to this specification.

WILLIAM OSWALD LITTLEBURY.